(12) United States Patent
Chen

(10) Patent No.: US 8,144,768 B2
(45) Date of Patent: *Mar. 27, 2012

(54) APPARATUS AND METHOD FOR CONSERVING MEMORY IN A FINE GRANULARITY SCALABILITY CODING SYSTEM

(75) Inventor: Xuemin Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1563 days.

This patent is subject to a terminal disclaimer.

(21) Appl. No.: 11/580,894

(22) Filed: Oct. 16, 2006

(65) Prior Publication Data

US 2007/0030893 A1   Feb. 8, 2007

Related U.S. Application Data

(63) Continuation of application No. 09/892,010, filed on Jun. 26, 2001, now Pat. No. 7,133,449.

(60) Provisional application No. 60/233,165, filed on Sep. 18, 2000.

(51) Int. Cl.
  *H04N 7/12*    (2006.01)
  *H04N 11/02*   (2006.01)
  *H04N 11/04*   (2006.01)
  *H04B 1/66*    (2006.01)

(52) U.S. Cl. .................................................. 375/240.1

(58) Field of Classification Search .................. None
See application file for complete search history.

(56) References Cited

U.S. PATENT DOCUMENTS

| | | | |
|---|---|---|---|
| 5,742,343 | A | 4/1998 | Haskell et al. |
| 5,815,601 | A | 9/1998 | Katata et al. |
| 5,886,736 | A | 3/1999 | Chen |
| 5,963,257 | A | 10/1999 | Katata et al. |
| 5,978,155 | A | 11/1999 | Suenaga |
| 6,023,299 | A | 2/2000 | Katata et al. |
| 6,542,549 | B1 | 4/2003 | Tan et al. |
| 6,567,427 | B1 | 5/2003 | Suzuki et al. |
| 6,639,943 | B1 | 10/2003 | Radha et al. |
| 2002/0021761 | A1 | 2/2002 | Zhang et al. |

FOREIGN PATENT DOCUMENTS

| | | |
|---|---|---|
| EP | 0 994 627 A2 | 4/2000 |
| WO | WO 01/69935 A1 | 9/2001 |

OTHER PUBLICATIONS

M. van der Schaar et al., *A Novel MPEG-4 Based Hybrid Temporal-SNR Scalability for Internet Video*, IEEE, 2000, pp. 548-551.

(Continued)

*Primary Examiner* — Nhon Diep
(74) *Attorney, Agent, or Firm* — Sterne, Kessler, Goldstein & Fox P.L.L.C.

(57) ABSTRACT

Decoding time stamps (DTSs) and presentation time stamps (PTSs) are used in fine granularity scalability (FGS) coding during MPEG-4 video coding. An input video is encoded in an FGS encoder into a base layer bitstream and an enhancement bitstream. The bitstreams are provided over a variable bandwidth channel to an FGS decoder. The DTSs and the PTSs are selected during encoding as to conserve memory during FGS decoding. The video object planes (VOP) in the bitstreams include base VOPs and FGS VOPs, and may also include fine granularity temporal scalability (FGST) VOPs. The FGS VOPs and the FGST VOPs may be organized in the same layer or in different layers. The base VOPs are combined with the FGS VOPs and the FGST VOPs to generate enhanced VOPs.

38 Claims, 3 Drawing Sheets

OTHER PUBLICATIONS

Chou et al., The MPEG-4 systems and description languages: A way ahead in audio visual information representation, Signal Processing: *Imaging Communication*, 1997, pp. 385-431, vol. 9.

Sarginson, MPEG-2: *A Tutorial Introduction to the Systems Layer*, IEEE, 1995, pp. 4/1-4/13.

Li, Weiping et al., "Fine Granularity Scalability in MPEG-4 for Streaming Video," IEEE International Symposium on Circuits and Systems, Geneva, Switzerland, vol. 1, pp. 299-302, May 28-31, 2000.

Chen, Sherman, "Accredited Standards Committee NCITS, Information Processing Systems NCITS L3, Audio/Picture Coding: Comments on ISO/IEC 14496-2 PDAM4," 2 pages, Oct. 2000.

Final Proposed Draft Amendment (FPDAM 4) Information Technology—Coding of Audio-Visual Objects—Part 2: Visual, Amendment 4: Streaming video profile, ISO/IEC 14496-2:1999/FPDAM 4, Beijing, PRC, 55 pages, Jul. 2000.

Final Draft International Standard, Information Technology—Generic Coding of Audio-Visual Objects—Part 2: Visual, ISO/IEC FDIS 14496-2, ISO/IEC Copyright Office, Geneva, Switzerland, 346 pages, Atlantic City, Oct. 1998.

APPARATUS AND METHOD FOR CONSERVING MEMORY IN A FINE GRANULARITY SCALABILITY CODING SYSTEM

CROSS-REFERENCE TO RELATED APPLICATIONS

The present application is a continuation of U.S. patent application Ser. No. 09/892,010, filed Jun. 26, 2001, now U.S. Pat. No. 7,133,449, which claims priority to U.S. Provisional Application No. 60/233,165 entitled "Apparatus and Method for Conserving Memory in a Fine Granularity Scalability Coding System" filed Sep. 18, 2000, the contents of which are fully incorporated by reference herein.

FIELD OF THE INVENTION

The present invention relates to video coding, and more particularly to a system for conserving memory during decoding in a fine granularity scalability coding system.

BACKGROUND OF THE INVENTION

Video coding has conventionally focused on improving video quality at a particular bit rate. With the rapid growth of network video applications, such as Internet streaming video, there is an impetus to optimize the video quality over a range of bit rates. Further, because of the wide variety of video servers and varying channel connections, there has been an interest in determining the bit rate at which the video quality should be optimized.

The variation in transmission bandwidth has led to the idea of providing fine granularity scalability (FGS) for streaming video. FGS coding is used, for example, in MPEG-4 streaming video applications.

The use of FGS encoding and decoding for streaming video is described in ISO/IEC JTC1/SC 29/WG 11 N2502, International Organisation for Standardisation, "Information Technology-Generic Coding of Audio-Visual Objects—Part 2: Visual, ISO/IEC FDIS 14496-2, Final Draft International Standard," Atlantic City, October 1998, and ISO/IEC JTC1/SC 29/WG 11 N3518, International Organisation for Standardisation, "Information Technology-Generic Coding of Audio-Visual Objects—Part 2: Visual, Amendment 4: Streaming video profile, ISO/IEC 14496-2:1999/FPDAM 4, Final Proposed Draft Amendment (FPDAM 4)," Beijing, July 2000, the contents of which are incorporated by reference herein.

As described in an article by Li et al. entitled "Fine Granularity Scalability in MPEG-4 Streaming Video," Proceedings of the 2000 IEEE International Symposium on Circuit and Systems (ISCAS), Vol. 1, Geneva, 2000, the contents of which are incorporated by reference herein, the encoder generates a base layer and an enhancement layer that may be truncated to any amount of bits within a video object plane (VOP). The remaining portion preferably improves the quality of the VOP. In other words, receiving more FGS enhancement bits typically results in better quality in the reconstructed video. Thus, by using FGS coding, no single bit rate typically needs to be given to the FGS encoder, but only a bit rate range. The FGS encoder preferably generates a base layer to meet the lower bound of the bit rate range and an enhancement layer to meet the upper bound of the bit rate range.

The FGS enhancement bitstream may be sliced and packetized at the transmission time to satisfy the varying user bit rates. This characteristic makes FGS suitable for applications where transmission bandwidth varies. To this end, bit plane coding of quantized DCT coefficients is used. Different from the traditional run-value coding, the bit plane coding is used to encode the quantized DCT coefficients one bit plane at a time.

In FGS, the enhancement layers are inherently tightly coupled to the base layer. Without appropriate time stamping on decoding and presentation, the decoding process will consume more memory than may otherwise be required. Additional memory leads to increased decoder costs, size and reduced efficiency of decoders, and may hinder the development of a standardized protocol for FGS. The problem is particularly pronounced with FGS temporal scalability (FGST), as the enhancement structures may include separate or combined enhancement layers for FGS and FGST. There is therefore a need to provide an apparatus and method for time stamping in a manner that helps to conserves memory requirements in an FGS system.

SUMMARY OF THE INVENTION

In an embodiment according to the present invention, a method of encoding a received video stream is provided. A base bitstream comprising one or more base video object planes (VOPs) is generated using the video stream, where each base VOP is associated with a base presentation time stamp (PTS) and a base decoding time stamp (DTS). A first enhancement bitstream comprising one or more first enhancement VOPs is also generated using the video stream, where each first enhancement VOP is associated with a corresponding base VOP, a first DTS and a first PTS. The first DTS and the first PTS associated with each first enhancement VOP are selected to be equal to one another, the first PTS associated with each first enhancement VOP is selected to be equal to the base PTS associated with its corresponding base VOP, and the first DTS associated with each first enhancement VOP is selected to be equal to the base DTS associated with one of the base VOPs.

In another embodiment according to the present invention, a method of decoding a received multiplexed bitstream to generate a video stream is provided. The multiplexed bitstream is demultiplexed and depacketized to generate a base bitstream and a first enhancement bitstream. The base bitstream is decoded to generate one or more base VOPs, where each base VOP is associated with a base PTS and a base DTS. The first enhancement bitstream is decoded to generate one or more first enhancement VOPs, where each first enhancement VOP is associated with a corresponding base VOP, a first DTS and a first PTS. The first enhancement VOPs and the base VOPs are presented to be displayed. Each first enhancement VOP is decoded and presented at the same time unit, and each first enhancement VOP and its corresponding base VOP are presented at the same time unit.

In yet another embodiment of the present invention, a video encoding system for generating a base bitstream and one or more enhancement bitstreams using a video stream is provided. The video encoding system comprises a base encoder, an enhancement encoder and a multiplexer. The base encoder is used for receiving the video stream and for generating the base bitstream using the video stream, where the base bitstream comprises one or more base VOPs. The enhancement encoder is used for receiving processed video data from the base encoder and for generating a first enhancement bitstream using the processed video data, where the first enhancement bitstream comprises one or more first enhancement VOPs, and each first enhancement VOP is associated with a corresponding base VOP. The multiplexer is used for time stamping each base VOP with a base DTS and a base PTS, for time stamping each first enhancement VOP with a first DTS and a first PTS, for packetizing the base bitstream and the first enhancement bitstream into packets, and for multiplexing the packets to generate a multiplexed bitstream. The first DTS and the first PTS associated with each first enhancement VOP are selected to be equal to one another, the first PTS associated with each first enhancement VOP is selected to be equal to the base PTS associated with its corresponding base VOP, and the first DTS associated with each first enhancement VOP is selected to be equal to the base DTS associated with one of the base VOPs.

In still another embodiment of the present invention, a video decoding system for generating a base layer video and an enhancement video using a multiplexed bitstream is provided. The video decoding system comprises a demultiplexer, a base decoder and an enhancement decoder. The demultiplexer is used for demultiplexing and depacketizing the multiplexed bitstream to generate a base bitstream and a first enhancement bitstream. The base decoder is used for decoding the base bitstream to generate one or more base VOPs, where each base VOP is associated with a base PTS and a base DTS. The enhancement decoder is used for decoding the first enhancement bitstream to generate one or more first enhancement VOPs, where each first enhancement VOP is associated with a corresponding base VOP, a first DTS and a first PTS. Each first enhancement VOP is decoded and presented at the same time unit, and each first enhancement VOP and its corresponding base VOP are presented at the same time unit.

BRIEF DESCRIPTION OF THE DRAWINGS

These and other features of the present invention will be better understood by reference to the following detailed description, taken in conjunction with the accompanying drawings, wherein.

DETAILED DESCRIPTION

Figure 1:
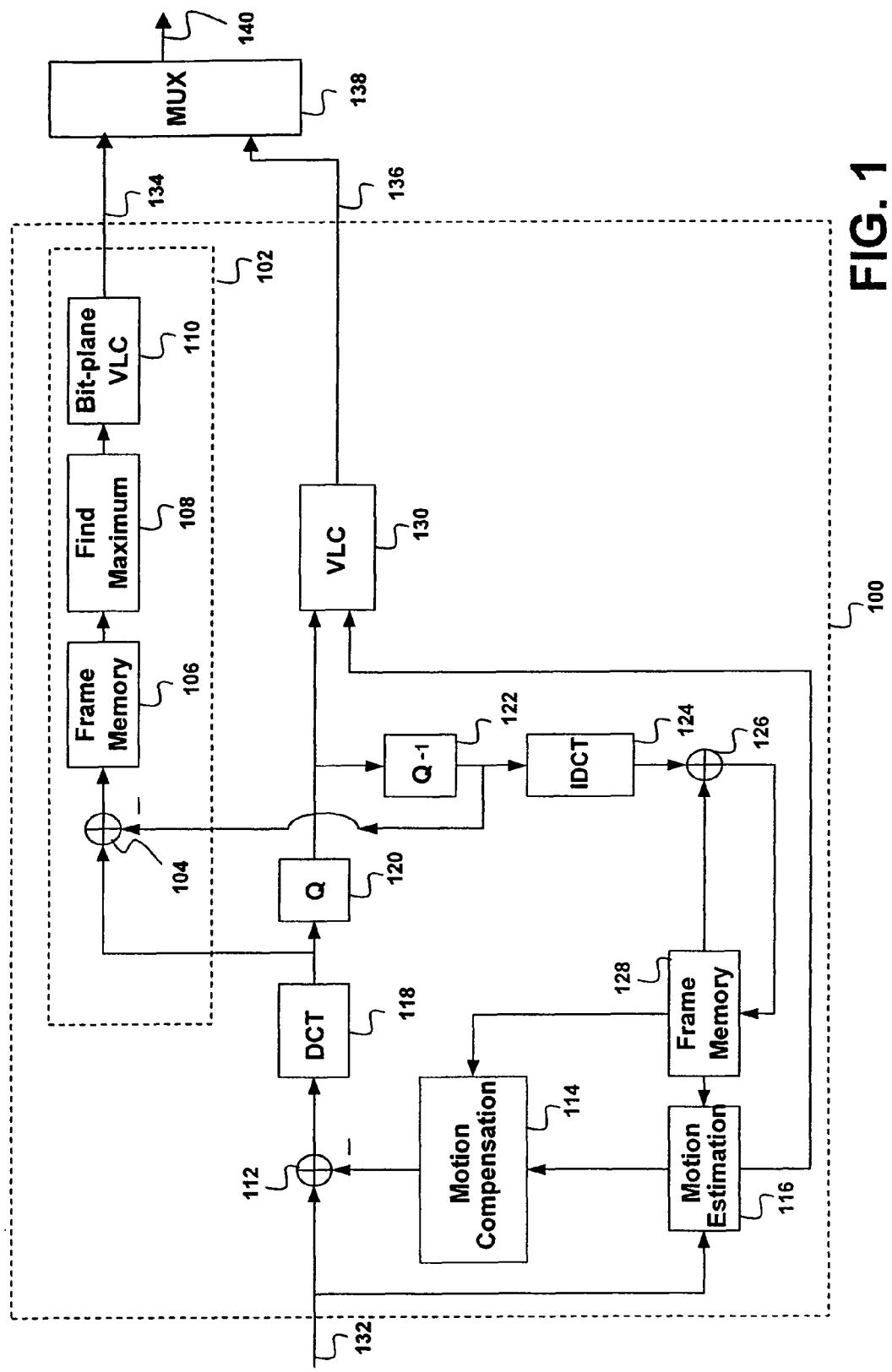
FIG. 1 is a block diagram of an exemplary FGS encoder, which may be used to implement an embodiment according to the present invention.

FIG. 1 is a block diagram of an exemplary FGS encoder 100 and a multiplexer 138, which together may be programmed to implement embodiments of the present invention. The FGS encoder 100 receives an input video 132, and generates a base layer bitstream 136 and an enhancement bitstream 134. The base layer bitstream preferably is generated using MPEG-4 version-1 encoding. The generation of the base layer bitstream using MPEG-4 version-1 encoding is well known to those skilled in the art.

The input video 132 may be in Standard Definition television (SDTV) and/or High Definition television (HDTV) formats. Further, the input video 132 may be in one or more of analog and/or digital video formats, which may include, but are not limited to, both component (e.g., $YP_RP_B$, $YC_RC_B$ and RGB) and composite video, e.g., NTSC, PAL or SECAM format video, or Y/C (S-video) compatible formats. The input video 132 may be compatible with Digital Visual Interface (DVI) standard or may be in any other customized display formats.

The base layer bitstream 136 may comprise MPEG-4 video streams that are compatible with MPEG-4 Advanced Simple Profile or MPEG-2 Main Profile video streams, as well as any other standard digital cable and satellite video/audio streams.

In an embodiment according to the present invention, to meet processing demands, the FGS encoder 100 and the multiplexer 138 preferably are implemented on one or more integrated circuit chips. In other embodiments, the FGS encoder 100 and/or the multiplexer 138 may be implemented using software (e.g., microprocessor-based), hardware (e.g., ASIC), firmware (e.g., FPGA, PROM, etc.) or any combination of the software, hardware and firmware.

The FGS encoder 100 includes an FGS enhancement encoder 102. The FGS enhancement encoder 102 preferably generates the enhancement bitstream 134 through FGS enhancement encoding. As illustrated in FIG. 1, the FGS enhancement encoder 102 receives original discrete cosine transform (DCT) coefficients from a DCT module 118 and reconstructed (inverse quantized) DCT coefficients from an inverse quantizer ($IQTZ/Q^{-1}$) module 122, and uses them to generate the enhancement bitstream 134.

Each reconstructed DCT coefficient preferably is subtracted from the corresponding original DCT coefficient in a subtractor 104 to generate a residue. The residues preferably are stored in a frame memory 106. After obtaining all the DCT residues of a VOP, a maximum absolute value of the residues preferably is found in a find maximum module 108, and the maximum number of bit planes for the VOP preferably is determined using the maximum absolute value of the residue.

Bit planes are formed in accordance with the determined maximum number of bit planes and variable length encoded in a bit-plane variable length encoder 110 to generate the enhancement bitstream 134. The structure of the FGS encoder and methods of encoding base layers and FGS layers are well known to those skilled in the art.

The enhancement bitstream 134 and the base layer bitstream 136 preferably are packetized and multiplexed in multiplexer 138, which provides a multiplexed stream 140. The multiplexed stream 140, for example, may be a transport stream such as an MPEG-4 Transport stream.

The multiplexed stream 140 is provided to a network to be received by one or more FGS decoders over variable bandwidth channels, which may include any combination of the Internet, Intranets, T1 lines, LANs, MANs, WANs, DSL, Cable, satellite link, Bluetooth, home networking, and the like using various different communications protocols, such as, for example, TCP/IP and UDP/IP. The multiplexer 140 preferably also inserts decoding time stamps (DTSs) and presentation time stamps (PTSs) into packet headers for synchronization of the decoding/presentation with a system clock. The DTSs indicate the decoding time of VOPs contained in the packets, while the PTSs indicate the presentation time of the decoded and reconstructed VOPs.

Figure 2:
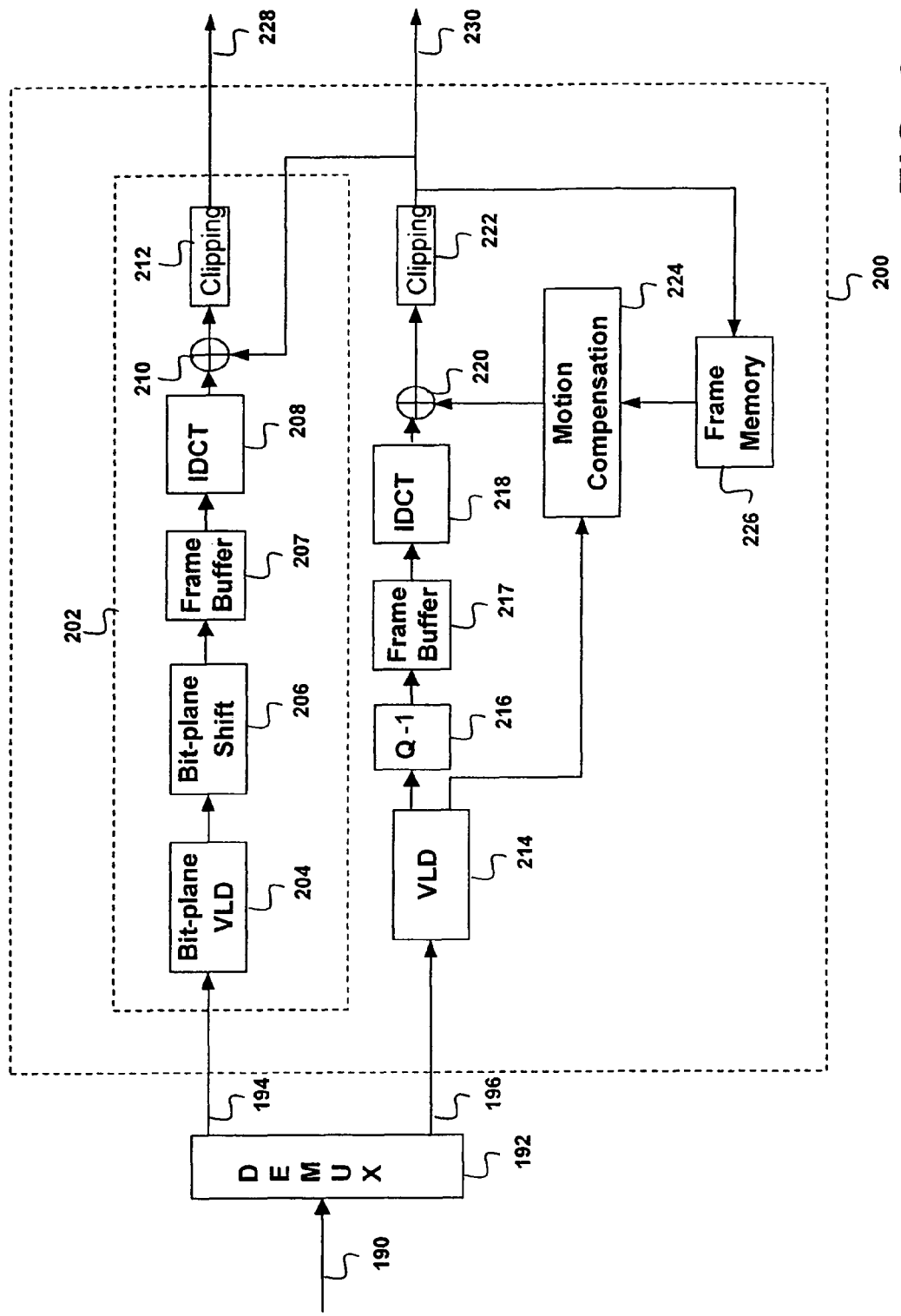
FIG. 2 is a block diagram of an exemplary FGS decoder, which may be used to implement an embodiment according to the present invention.

FIG. 2 is a block diagram of an exemplary FGS decoder 200 coupled to a demultiplexer 192, which together may be programmed to implement embodiments of the present invention. The demultiplexer 192 receives a multiplexed bitstream 190.

The multiplexed bitstream may contain all or portions of base layer and enhancement bitstreams provided by an FGS encoder, such as, for example the FGS encoder 100 of FIG. 1, depending on conditions of the variable bandwidth channel over which the multiplexed bitstream is transmitted and received. For example, if only a limited bandwidth is available, the received multiplexed bitstream may include only the base layer bitstream and none or a portion of the enhancement bitstream. For another example, if the amount of available bandwidth varies during the transmission of a particular video stream, the amount of the received enhancement bitstreams would vary accordingly.

In an embodiment according to the present invention, to meet processing demands, the FGS decoder 200 and the demultiplexer 192 preferably are implemented on one or more integrated circuit chips. In other embodiments, the FGS decoder 200 and/or the demultiplexer 192 may be implemented using software (e.g., microprocessor-based), hardware (e.g., ASIC), firmware (e.g., FPGA, PROM, etc.) or any combination of the software, hardware and firmware.

The demultiplexer 192 demultiplexes the multiplexed bitstream 190, extracts DTSs and PTSs from the packets, and preferably provides an enhancement bitstream 194 and a base layer bitstream 196 to the FGS decoder 200. The FGS decoder 200 preferably provides an enhancement video 228. The FGS decoder may also provide a base layer video as an optional output 230. If only the base layer bitstream is available, for example, due to bandwidth limitation, the FGS decoder 200 may only output the base layer video 230 and not the enhancement video 228.

The number of bit planes received for the enhancement layer would depend on channel bandwidth. For example, as more bandwidth is available in the variable bandwidth channel, an increased number of bit planes may be received. In cases when only a small amount of bandwidth is available, only the base layer may be received. The structure of the FGS decoder, and methods of decoding the base layer bitstreams and the enhancement bitstreams are well known to those skilled in the art.

The FGS decoder 200 includes a variable length decoder (VLD) 214, an inverse quantizer (IQTZ) 216, a frame buffer 217, an inverse discrete cosine transform block (IDCT) 218, a motion compensation block 224, a frame memory 226, a summer 220 and a clipping unit 222. The VLD 214 receives the base layer bitstream 196. The VLD 214, for example, may be a Huffman decoder.

The base layer bitstream 196 may comprise MPEG-4 video streams that are compatible with Main Profile at Main Level (MP@ML), Main Profile at High Level (MP@HL), and 4:2:2 Profile at Main Level (4:2:2@ML), including ATSC (Advanced Television Systems Committee) HDTV (High Definition television) video streams, as well as any other standard digital cable and satellite video/audio streams.

The VLD 214 sends encoded picture (macroblocks) to the IQTZ 216, which is inverse quantized and stored in the frame buffer 217 as DCT coefficients. The DCT coefficients are then sent to the IDCT 218 for inverse discrete cosine transform. Meanwhile, the VLD 214 extracts motion vector information from the base layer bitstream and sends it to a motion compensation block 224 for reconstruction of motion vectors and pixel prediction.

The motion compensation block 224 uses the reconstructed motion vectors and stored pictures (fields/frames) from a frame memory 226 to predict pixels and provide them to a summer 220. The summer 220 sums the predicted pixels and the decoded picture from the IDCT 218 to reconstruct the picture that was encoded by the FGS encoder. The reconstructed picture is then stored in a frame memory 226 after being clipped (e.g., to a value range of 0 to 255) by the clipping unit 222, and may be provided as the base layer video 230. The reconstructed picture may also be used as a forward picture and/or backward picture for decoding of other pictures.

The reconstructed pictures may be in Standard Definition television (SDTV) and/or High Definition television (HDTV) formats. Further, the reconstructed pictures may be converted to and/or displayed in one or more of analog and/or digital video formats, which may include, but are not limited to, both component (e.g., $YP_RP_B$, $YC_RC_B$ and RGB) and composite video, e.g., NTSC, PAL or SECAM format video, or Y/C (S-video) compatible formats. The reconstructed pictures may also be converted to be displayed on a Digital Visual Interface (DVI) compatible monitor or converted to be in any other customized display formats.

The FGS decoder also includes an FGS enhancement decoder 202. To reconstruct the enhanced VOP, the enhancement bitstream is first decoded using a bit-plane (BP) variable length decoder (VLD) 204 in the FGS enhancement decoder 202. The decoded block-BPs preferably are used to reconstruct DCT coefficients in the DCT domain. The reconstructed DCT coefficients are then right-shifted in a bit-plane shifter 206 based on the frequency weighting and selective enhancement shifting factors. The bit-plane shifter 206 preferably generates as an output the DCT coefficients of the image domain residues.

The DCT coefficients preferably are first stored in a frame buffer 207. The frame buffer preferably has a capacity to store DCT coefficients for one or more VOPs of the enhancement layer. DCT coefficients for the base layer preferably are stored in the frame buffer 217. The frame buffer 217 preferably has a capacity to store the DCT coefficients for one or more VOPs of the base layer. The frame buffer 207 and the frame buffer 217 may occupy contiguous or non-contiguous memory spaces. The frame buffer 207 and the frame buffer 217 may even occupy the identical memory space.

The DCT coefficients of the enhancement layer VOPs preferably are provided to an inverse discrete cosine transform (IDCT) module 208. The IDCT module 208 preferably outputs the image domain residues, and provides them to a summer 210. The summer 210 also receives the reconstructed and clipped base-layer pixels. The summer 210 preferably adds the image domain residues to the reconstructed and clipped base-layer pixels to reconstruct the enhanced VOP. The reconstructed enhanced VOP pixels preferably are limited into the value range between 0 and 255 by a clipping unit 212 in the FGS enhancement decoder 202 to generate the enhanced video 228.

In addition to using the base layer and the FGS enhancement layer, an FGST layer using FGS temporal scalability (FGST) may also be used in order to increase the bit rate range to be covered. In some embodiments, FGS and FGST may be included in a combined enhancement layer. In other embodiments, FGS and FGST may be included in different enhancement layers.

Figure 3:
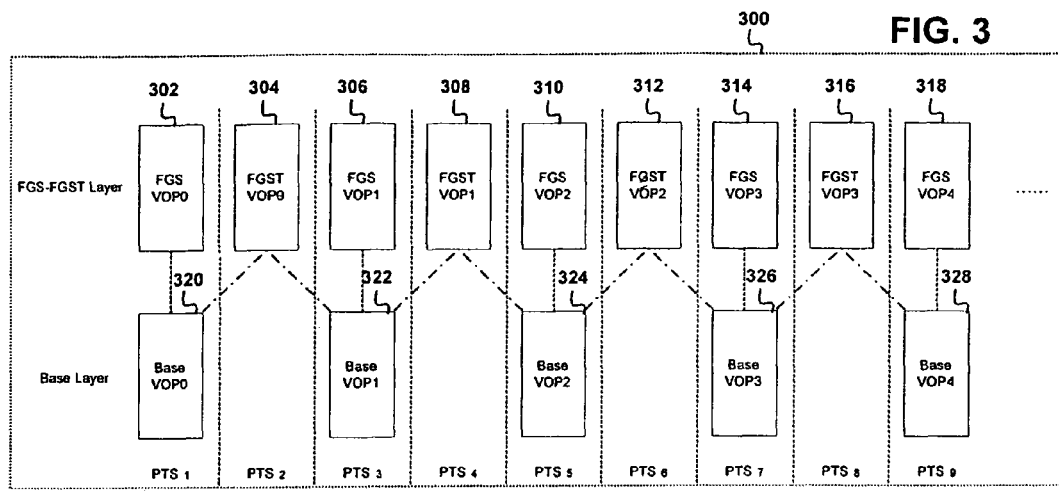
FIG. 3 is a diagram illustrating a display order of FGS VOPs and FGST VOPs in one combined enhancement layer in reference to base VOPs in a base layer in an embodiment according to the present invention.

FIG. 3 is a diagram illustrating a display order of FGS VOPs and FGST VOPs in one combined enhancement layer in reference to base VOPs in a base layer in an embodiment according to the present invention. Of course, the base layer and enhancement bitstreams for FIG. 3 may include a number of additional Base VOPs, FGS VOPs and FGST VOPs, the illustration of all of which is impractical, and a subset of those VOPs are shown for illustrative purposes only.

It is inherent in FGS that the enhancement layers are very tightly coupled to the base layer. Without appropriate stamping on decoding and presentation, the decoding process may consume more memory than may otherwise be required, particularly for FGST decoding process. In FIG. 3, PTSi denotes the presentation time stamp for the i-th time interval.

As illustrated in FIG. 3, for example, an FGS VOP and corresponding base VOP are used together to present a corresponding enhanced VOP. For example, a dotted line between FGS VOP0 302 and Base VOP0 320 indicates that these VOPs are used together to present the corresponding enhanced VOP. Similarly, FGS VOP1 306 is used together with Base VOP1 322; FGS VOP2 310 is used together with Base VOP2 324; FGS VOP3 314 is used together with Base VOP3 326; and FGS VOP4 318 is used together with VOP4 328, respectively, to present a corresponding enhanced VOP.

As also illustrated in FIG. 3, two adjacent base VOPs are used to present an enhanced VOP with FGST VOP. For example, half-dotted lines between FGST VOP0 304 and Base VOP0 320, Base VOP1 322 indicate that these base VOPs are used together with FGST VOP0 to present a corresponding enhanced VOP. Similarly, Base VOP1 322 and Base VOP2 324 are used together with FGST VOP 1 308; Base VOP2 324 and Base VOP3 326 are used together with FGST VOP2 312; and Base VOP3 326 and Base VOP4 328 are used together with FGST VOP3 316.

In embodiments according to the present invention, the size of frame buffers for storing DCT coefficients preferably is reduced by arranging decoding and presentation times for VOPs so as to decrease the number of FGS and base VOPs that are stored in the frame buffers at any give time for presenting FGST VOPs.

In an embodiment of the present invention, the following principles preferably are applied for time stamping during the encoding process: 1) the presentation time stamp (PTS) and the decoding time stamp (DTS) of the FGS VOP are selected to be equal at all times; 2) PTS and DTS of a FGST VOP are selected to be equal at all times; 3) PTS of a FGS VOP is equal to PTS of its corresponding base VOP; 4) DTS of a FGS VOP is not equal to DTS of a FGST VOP; and 5) DTS of a FGS VOP is equal to DTS of a base VOP at all times; and 6) DTS of a FGST VOP is stamped at the interval that is right after its latest possible reference base VOP.

In another embodiment of the present invention, the following principles preferably are applied during the decoding process: 1) Each FGS VOP is decoded and presented at the same time unit, i.e., DTS=PTS; 2) Each FGST VOP is decoded and presented at the same time unit; 3) Each FGS VOP and its corresponding Base VOP are presented at the same time unit; 4) The FGST VOPs are decoded immediately after their corresponding required reference VOPs are decoded, unless this requirement causes the FGST VOPs to be decoded out of display order. In that case, the FGST VOPs are decoded in the display order.

Figure 4:
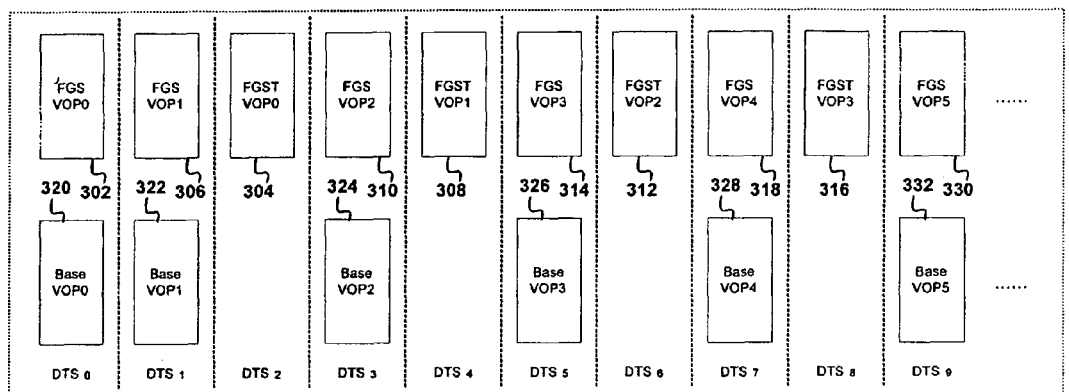
FIG. 4 is a diagram illustrating a decoding order of FGS VOPs and FGST VOPs in one combined enhancement layer in reference to base VOPs in a base layer in an embodiment according to the present invention.
Figure 5:
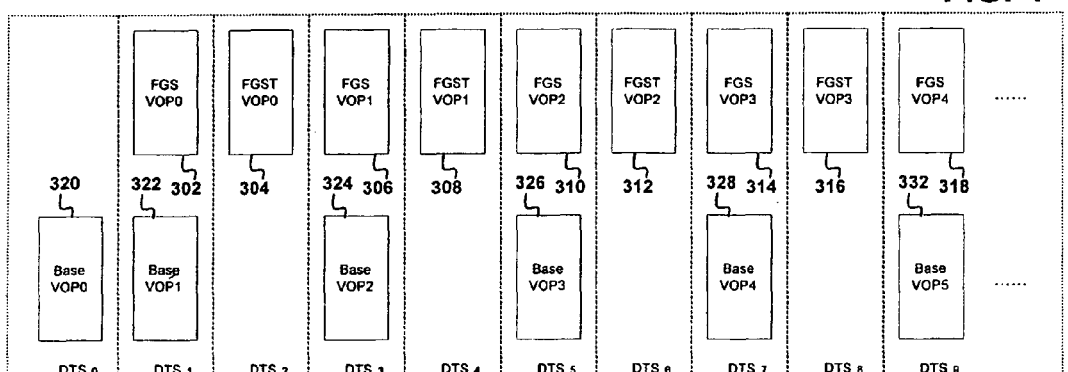
FIG. 5 is a diagram illustrating a decoding order of FGS VOPs and FGST VOPs in one combined enhancement layer in reference to base VOPs in a base layer in another embodiment according to the present invention.

Two examples of different time stamping techniques on the same set of VOPs are shown in FIGS. 4 and 5, respectively. One or more principles for selecting PTSs and DTSs in an embodiment according to the present invention have been applied to decoding processes depicted in FIGS. 4 and 5. In FIGS. 4 and 5, DTSi denotes the decoding time stamp for the i-th time interval. It can be seen that at most four FGS frame buffers are used at any given moment in FIG. 4 while at most three FGS frame buffers are used at any given moment in FIG. 5.

In FIG. 4, it can be seen that DCT coefficients for a maximum of four VOPs are stored in the frame buffers for each FGST VOP to be decoded. For example, Base VOP0 320 (with DTS 0 and PTS 1) as well as Base VOP1 322 and FGS VOP1 306 (with DTS 1 and PTS 3) are stored in the frame buffers before FGST VOP0 304 (with DTS 2 and PTS 2) is decoded. In this example, four frame buffers are needed to store DCT coefficients for Base VOP0, Base VOP1, FGS VOP1 and FGST VOP0 for decoding FGST VOP0.

The presentation time for FGST VOP0 304 (with PTS 2) as shown in FIG. 3 is earlier in time than the presentation time for the FGS VOP1 306 and Base VOP1 322 (with PTS 3). However, FGST VOP0 304 (with DTS 2) is not decoded until both the FGS VOP0 302 and Base VOP0 320 pair (with DTS 0) and the FGS VOP1 306 and Base VOP1 322 pair (with DTS 1) are first decoded. Thus, DCT coefficients for three VOPs (Base VOP0 320, FGS VOP1 306, Base VOP1 322) are stored in the frame buffers for later presentation. Therefore, as stated above, the frame buffers have capacity to store DCT coefficients for up to four VOPs (including the FGST VOP being decoded and presented) in this embodiment.

Similarly, each of FGST VOP1 308 (with DTS 4 and PTS 4), FGST VOP2 312 (with DTS 6 and PTS 6) and FGST VOP3 316 (with DTS 8 and PTS 8) is not decoded until a pair of FGS and Base VOPs, which is presented at a later time, has been decoded, and each FGST VOP uses two adjacent Base VOPs for presentation. This further shows that the frame buffers for the FGS decoder in this embodiment should have capacity to store DCT coefficients for up to four VOPs at the same time.

In the embodiment illustrated in FIG. 5, DCT coefficients for a maximum of only three VOPs are stored in the frame buffers for each FGST VOP to be decoded. For example, Base VOP0 320 and Base VOP1 322 with DTS 0 and DTS 1, respectively, are stored in the frame buffers before FGST VOP0 304 (with DTS 2) is decoded, and there are no FGST VOPs in FIG. 5 for which coefficients of more than three VOPs (including a frame buffer for the FGST VOP being decoded and presented) are stored in the frame buffers at the same time.

As further examples, FGST VOP1 308 (with DTS 4 and PTS 4) is decoded with the storage of DCT coefficients for Base VOP1 322 (DTS 1 and PTS 3) and Base VOP2 324 (DTS 3 and PTS 5); FGST VOP2 312 (with DTS 6 and PTS 6) is decoded with the storage of DCT coefficients for Base VOP2 324 (DTS 3 and PTS 5) and Base VOP3 326 (DTS 5 and PTS 7); and FGST VOP3 316 (with DTS 8 and PTS 8) is decoded with the storage of DCT coefficients for Base VOP3 326 (DTS 5 and PTS 7) and Base VOP4 328 (DTS 7 and PTS 9). It can be seen from these examples that each FGST VOP is decoded with the storage of DCT coefficients for two Base VOPs and the FGST VOP itself.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

I claim:

1. A method of encoding a video stream, the method comprising the steps of:
   receiving the video stream;
   generating a base bitstream comprising one or more base video object planes (VOPs) using the video stream, each base VOP being associated with a base presentation time stamp (PTS) and a base decoding time stamp (DTS); and generating a first enhancement bitstream comprising one or more first enhancement VOPs using the video stream, each first enhancement VOP being associated with a corresponding base VOP, a first DTS and a first PTS, wherein the first DTS and the first PTS associated with each first enhancement VOP are selected to be equal to one another, the first PTS associated with each first enhancement VOP is selected to be equal to the base PTS associated with its corresponding base VOP, and the first DTS associated with each first enhancement VOP is selected to be equal to the base DTS associated with one of the base VOPs.

2. The method of encoding the video stream according to claim 1, the method further comprising the step of generating a second enhancement bitstream comprising one or more second enhancement VOPs using the video stream, wherein each second enhancement VOP is associated with two corresponding base VOPs, a second DTS and a second PTS, and wherein the second DTS and the second PTS associated with each second enhancement VOP are selected to be equal to one another.

3. The method of encoding the video stream according to claim 2, wherein the first DTS is selected to be different from any of the second DTSs.

4. The method of encoding the video stream according to claim 3, wherein the second DTS associated with each second enhancement VOP represents an interval that is right after the later of the two intervals represented by the two base DTSs associated with its two corresponding base VOPs.

5. The method of encoding the video stream according to claim 1, wherein the encoding comprises MPEG-4 encoding.

6. The method of encoding the video stream according to claim 2, wherein the encoding comprises fine granularity scalability (FGS) encoding.

7. The method of encoding the video stream according to claim 6, wherein the first enhancement bitstream comprises FGS bitstream and the first enhancement VOPs comprise FGS VOPs.

8. The method of encoding the video stream according to claim 7, wherein the second enhancement bitstream comprises FGS temporal scalability (FGST) bitstream and the second enhancement VOPs comprise FGST VOPs.

9. The method of encoding the video stream according to claim 2, the method further comprising the step of combining the first and second enhancement bitstreams to generate a single enhancement bitstream.

10. The method of encoding the video stream according to claim 1, the method further comprising the steps of packetizing the base bitstream and the first enhancement bitstream, and multiplexing the packetized bitstreams to generate a transport stream.

11. A method of decoding a multiplexed bitstream to generate a video stream, the method comprising the steps of:
receiving the multiplexed bitstream;
demultiplexing and depacketizing the multiplexed bitstream to generate a base bitstream and a first enhancement bitstream;
decoding the base bitstream to generate one or more base video object planes (VOPs), each base VOP being associated with a base presentation time stamp (PTS) and a base decoding time stamp (DTS);
decoding the first enhancement bitstream to generate one or more first enhancement VOPs, each first enhancement VOP being associated with a corresponding base VOP, a first DTS and a first PTS; and presenting the first enhancement VOPs and the base VOPs to be displayed,
wherein each first enhancement VOP is decoded and presented at the same time unit, and
wherein each first enhancement VOP and its corresponding base VOP are presented at the same time unit.

12. The method of decoding the multiplexed bitstream according to claim 11, wherein the demultiplexing and depacketizing step further generates a second enhancement bitstream comprising one or more second enhancement VOPs using the video stream, wherein each second enhancement VOP is associated with two corresponding base VOPs a second DTS and a second PTS, and wherein each second enhancement VOP is decoded and presented at the same time unit.

13. The method of decoding the multiplexed bitstream according to claim 12, wherein each second enhancement VOP is decoded right after the second of the two corresponding base VOPs has been decoded, unless this would cause the second enhancement VOPs to be decoded out of display order, in which case, the second enhancement VOPs are decoded in the display order.

14. The method of decoding the multiplexed bitstream according to claim 11 wherein the decoding comprises MPEG-4 decoding.

15. The method of decoding the multiplexed bitstream according to claim 12, wherein the decoding comprises fine granularity scalability (FGS) decoding.

16. The method of decoding the multiplexed bitstream according to claim 15, wherein the first enhancement bitstream comprises FGS bitstream and the first enhancement VOPs comprise FGS VOPs.

17. The method of decoding the multiplexed bitstream according to claim 16, wherein the second enhancement bitstream comprises FGS temporal scalability (FGST) bitstream and the second enhancement VOPs comprise FGST VOPs.

18. The method of decoding the multiplexed bitstream according to claim 11, wherein the multiplexed bitstream is an MPEG-4 Transport stream.

19. A video encoding system for generating a base bitstream and one or more enhancement bitstreams using a video stream, the video encoding system comprising:
a base encoder for receiving the video stream and for generating the base bitstream using the video stream, the base bitstream comprising one or more base video object planes (VOPs);
an enhancement encoder for receiving processed video data from the base encoder and for generating a first enhancement bitstream using the processed video data, the first enhancement bitstream comprising one or more first enhancement VOPs, each first enhancement VOP being associated with a corresponding base VOP; and
a multiplexer for time stamping each base VOP with a base decoding time stamp (DTS) and a base presentation time stamp (PTS), for time stamping each first enhancement VOP with a first DTS and a first PTS, for packetizing the base bitstream and the first enhancement bitstream into packets, and for multiplexing the packets to generate a multiplexed bitstream,
wherein the first DTS and the first PTS associated with each first enhancement VOP are selected to be equal to one another, the first PTS associated with each first enhancement VOP is selected to be equal to the base PTS associated with its corresponding base VOP, and the first DTS associated with each first enhancement VOP is selected to be equal to the base DTS associated with one of the base VOPs.

20. The video encoding system according to claim 19, wherein the enhancement encoder generates a second enhancement bitstream using the processed video data, the second enhancement bitstream comprises one or more second enhancement VOPs, and each second enhancement VOP is associated with two corresponding base VOPs, wherein the multiplexer time stamps each second enhancement VOP with a second DTS and a second PTS, packetizes the second enhancement bitstream into second packets, and multiplexes the second packets with the packets for the base bitstream and the first enhancement bitstream to generate the multiplexed bitstream, and wherein the second DTS and the second PTS associated with each second enhancement VOP are selected to be equal to one another.

21. The video encoding system according to claim 20, wherein the first DTS is selected to be different from any of the second DTSs.

22. The video encoding system according to claim 21, wherein the second DTS associated with each second enhancement VOP represents an interval that is right after the later of the two intervals represented by the two base DTSs associated with its two corresponding base VOPs.

23. The video encoding system according to claim 19, wherein the encoding comprises MPEG-4 encoding, and the multiplexed bitstream is an MPEG-4 Transport stream.

24. The video encoding system according to claim 20, wherein the encoding comprises fine granularity scalability (FGS) encoding.

25. The video encoding system according to claim 24, wherein the first enhancement bitstream comprises FGS bitstream and the first enhancement VOPs comprise FGS VOPs.

26. The video encoding system according to claim 25, wherein the second enhancement bitstream comprises FGS temporal scalability (FGST) bitstream and the second enhancement VOPs comprise FGST VOPs.

27. The video encoding system according to claim 20, wherein the first and second enhancement bitstreams are combined to generate a single enhancement bitstream.

28. The video encoding system according to claim 19, wherein each VOP comprise a plurality of bit planes.

29. The video encoding system according to claim 19, wherein the base encoder performs discrete cosine transform (DCT) on the video stream to generate DCT coefficients, and wherein the DCT coefficients are provided as the processed video data to the enhancement encoder.

30. A video decoding system for generating a base layer video and an enhancement video using a multiplexed bitstream, the video decoding system comprising:
a demultiplexer for demultiplexing and depacketizing the multiplexed bitstream to generate a base bitstream and a first enhancement bitstream;
a base decoder for decoding the base bitstream to generate one or more base video object planes (VOPs), each base VOP being associated with a base presentation time stamp (PTS) and a base decoding time stamp (DTS); and
an enhancement decoder for decoding the first enhancement bitstream to generate one or more first enhancement VOPs, each first enhancement VOP being associated with a corresponding base VOP, a first DTS and a first PTS,
wherein each first enhancement VOP is decoded and presented at the same time unit, and
wherein each first enhancement VOP and its corresponding base VOP are presented at the same time unit.

31. The video decoding system according to claim 30, wherein the demultiplexer generates a second enhancement bitstream, and the enhancement decoder decodes the second enhancement bitstream to generate one or more second enhancement VOPs, and wherein each second enhancement VOP is associated with two corresponding base VOPs, a second DTS and a second PTS, and wherein each second enhancement VOP is decoded and presented at the same time unit.

32. The video decoding system according to claim 31, wherein each second enhancement VOP is decoded right after the second of the two corresponding base VOPs has been decoded, unless this would cause the second enhancement VOPs to be decoded out of display order, in which case, the second enhancement VOPs are decoded in the display order.

33. The video decoding system according to claim 31, wherein the base decoder comprises one or more frame buffers for storing partially decoded base bitstream and the enhancement decoder comprises one or more frame buffers for storing partially decoded second enhancement bitstream, wherein not more than a total of three frame buffers are used at a time for decoding and presenting all of the base bitstream and the first and second enhancement bitstreams.

34. The video decoding system according to claim 30 wherein the decoding comprises MPEG-4 decoding.

35. The video decoding system according to claim 31, wherein the decoding comprises fine granularity scalability (FGS) decoding.

36. The video decoding system according to claim 35, wherein the first enhancement bitstream comprises FGS bitstream and the first enhancement VOPs comprise FGS VOPs.

37. The video decoding system according to claim 36, wherein the second enhancement bitstream comprises FGS temporal scalability (FGST) bitstream and the second enhancement VOPs comprise FGST VOPs.

38. The video decoding system according to claim 30, wherein the multiplexed bitstream is an MPEG-4 Transport stream.

* * * * *

UNITED STATES PATENT AND TRADEMARK OFFICE
CERTIFICATE OF CORRECTION

PATENT NO. : 8,144,768 B2
APPLICATION NO. : 11/580894
DATED : March 27, 2012
INVENTOR(S) : Xuemin Chen It is certified that error appears in the above-identified patent and that said Letters Patent is hereby corrected as shown below:

Column 10, Line 12, please replace "base VOPs a" with --base VOPs, a--.

Signed and Sealed this
Fourteenth Day of August, 2012

David J. Kappos
*Director of the United States Patent and Trademark Office*